April 8, 1947.    J. F. MAIENSHEIN    2,418,592
LIQUID DENSITY MEASURING APPARATUS
Filed Aug. 3, 1944
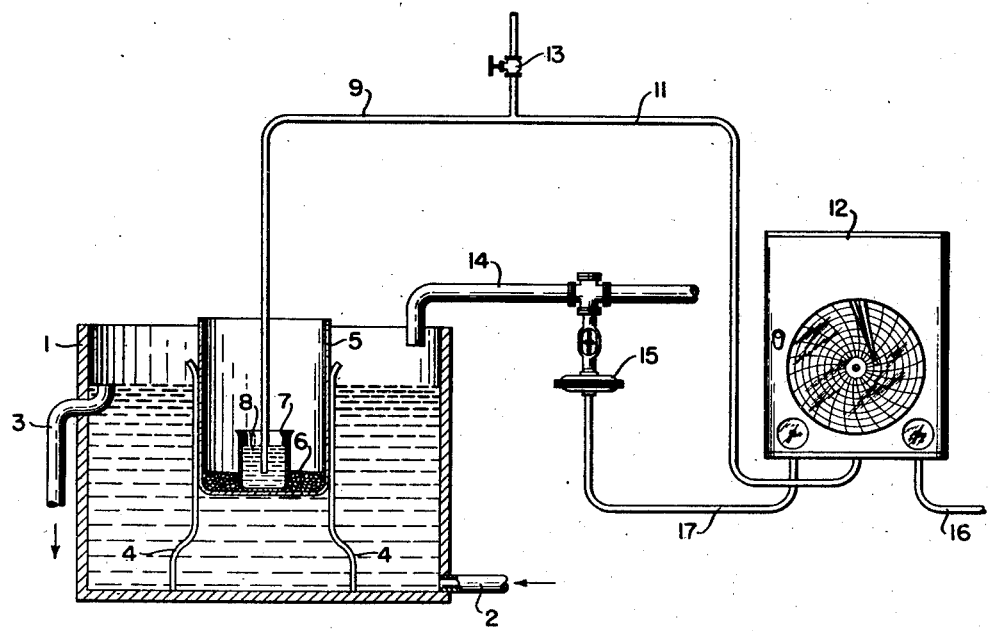
INVENTOR.
JOHN FREDERICK MAIENSHEIN
BY
*C. B. Spangenberg*
ATTORNEY.

Patented Apr. 8, 1947

2,418,592

UNITED STATES PATENT OFFICE 2,418,592

LIQUID DENSITY MEASURING APPARATUS

John Frederick Maienshein, Parkville, Md., assignor to The Brown Instrument Company, Philadelphia, Pa., a corporation of Pennsylvania Application August 3, 1944, Serial No. 547,915

5 Claims. (Cl. 73—33)

The present invention relates to devices for continuously measuring, recording, and controlling the specific gravity of a liquid. At times it becomes necessary to control the specific gravity of a liquid between such narrow limits that it is difficult for an ordinary control system to handle the job successfully, so that a special system is necessary.

It is an object of this invention to provide such a special measuring and control system which is capable of responding accurately to very small changes in the specific gravity of a liquid. It is a further object of the invention to provide a control system in which the effects of a change in specific gravity on the primary measuring element is magnified before being applied to the measuring and control instrument. It is also an object of the invention to provide a measuring and control system that may readily be adjusted so that it may operate through different ranges for the same change in specific gravity.

The invention consists of a pressure gauge that is responsive to the back pressure of a supply of air that is bubbled through a liquid. The depth of this liquid is varied in accordance with the specific gravity being measured, and the liquid through which the air is being bubbled has a specific gravity considerably greater than that of the liquid whose specific gravity is being measured. In practicing the invention a float is placed in the liquid to be measured. This float rises and falls as the specific gravity being measured varies, and has in it a container of mercury. Extending into the mercury is a pipe through which air is forced at a constant rate and at a pressure sufficient to bubble out. The back pressure of this air will vary with the depth of the mercury through which it must bubble, and this pressure is applied to a conventional pressure-responsive recording and control instrument. Since the mercury is much heavier than the liquid being measured any change in depth of the mercury through which the air is bubbled will produce a much greater change in the back pressure than could be obtained by a similar change in height of the liquid being measured.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawing, the single figure, partly in section, shows a complete control system embodying the invention.

Referring to the figure, there is shown a sampling tank 1 through which is continuously passed a sample of the liquid whose specific gravity is to be measured and controlled. To this end there is provided an inlet pipe 2, and an outlet pipe 3 which serves to maintain a constant level of liquid in the tank. The tank is provided with a series of guide members 4 which serve to guide a float 5 as it raises and lowers in the tank due to changes of the specific gravity of the liquid. The float may take a number of forms, but is shown herein as being an open-mouthed jar that can be made of glass or other material that will not be acted upon by the liquid. This jar has in it weights 6 that serve to hold it submerged to the proper depth and also has in it a container 7 which is filled to a given depth with a liquid 8, that preferably is mercury.

Extending into the mercury is a branch 9 of an air supply pipe, another branch 11 of which extends to the responsive element of a pressure measuring and controlling instrument 12. In the operation of the device air is forced through the pipes 9 and 11 in a volume that is regulated by a valve 13 so that there is a slow but continuous bubbling of air through the pipe 9 and the mercury. The resistance offered to the air as it bubbles through the mercury creates a back pressure which is measured by the instrument 12, the pressure varying with the depth of the mercury through which the air has to pass as it is being exhausted to the atmosphere.

In order to vary the specific gravity of the liquid in the tank 1, some diluting agent may be introduced in the tank through a pipe 14 in an amount that is controlled by the opening of a valve 15 in this pipe. The instrument 12 may take the form a pneumatic controller of the type disclosed in Moore Patent 2,125,081, granted on July 26, 1938. If an instrument of this type is used, air under a suitably regulated pressure will be introduced through a pipe 16 to the instrument and will be adjusted to a pressure varying in accordance with the specific gravity of the liquid. This air is supplied to the valve 15 through a pipe 17 to adjust the opening of the valve 15 in accordance herewith.

As is well-known, a weighted body such as the jar 5 will rise and fall in the liquid of the tank 1 as the specific gravity of the liquid changes.

Depending upon the range of the gravity to be measured, the size of the jar and its weight, the amount that the jar will raise or lower may readily be determined. Suppose, for example, that the liquid in the tank 1 is hydrochloric acid that has a specific gravity of 1.16 while the mercury in the container 7 has a specific gravity of 13.6. This means that the mercury is approximately 11.75 times as heavy as the acid. Therefore, for a given change in the level of the container 5 the back pressure of the air in pipe 9 bubbling through the mercury will be magnified 11¾ times over what it would be if this same air were bubbling through the liquid itself. It will be seen from the above that the use of mercury in the container 5 serves to greatly amplify any movement of the contents which is due to a change in gravity of the acid. Therefore, the instrument 12 is responsive to considerably larger pressure changes than it would be possible to obtain if the pipe 9 were immersed directly in the acid. For this reason the range of the instrument can be larger than would otherwise be possible and a much more sensitive control is obtained.

The value of the back pressure in the pipes 9 and 11 will vary as the depth of immersion of the pipe 9 varies. The range of pressure variation to which the instrument 12 is subjected will depend upon the amount the float 5 changes in level. For example, if the float moves one and one-half inches the range of the instrument would be 20 inches of water. The zero of the instrument, however, would depend on the minimum amount of mercury through which the air is bubbled.

The use of the mercury to amplify the pressure changes which are due to changes in specific gravity of the acid permit the use of an instrument which can control the specific gravity to a much closer point than would be possible by the small pressure changes that could be obtained from the acid itself.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described this invention, what I claim as new and desire to secure by Letters Patent is:

1. In a system for measuring a physical condition of a liquid, the combination of a float to be submerged in a body of the liquid having a constant level, an amount directly dependent upon said physical condition, a container having a body of a second liquid movable with said float, said second liquid being heavier than the liquid whose physical condition is being measured, means to bubble air through said second liquid, the back pressure of said air depending upon the position of said float, and means responsive to said back pressure to indicate the value thereof and therefore of said physical condition.

2. In a system for measuring the value of a physical condition of a liquid, the combination of a float to be submerged in a body of said liquid having a constant level an amount dependent upon the value of said physical condition, said float having a body of a second liquid in it, the second liquid being heavier than said first liquid, a fixed pipe extending into said second liquid an amount dependent upon the position of said float, means to force air through said pipe to bubble through said second liquid, the pressure of said air depending upon the depth of immersion of said pipe in said second liquid, and means responsive to the pressure of said air to exhibit the value thereof.

3. In a system to measure the specific gravity of a liquid, the combination of a float to be submerged in a body of said liquid that is maintained at a constant level, the amount said float is submerged depending upon the specific gravity of said liquid, said float having in it a body of a second liquid having a specific gravity larger than that of the first mentioned liquid, means cooperating with said second liquid to produce an air pressure varying in accordance with the amount said float is submerged in said first liquid, and exhibiting means responsive to said air pressure.

4. In a system for measuring the specific gravity of a liquid, the combination of a float to be placed in a body of said liquid having a constant level, the amount said float is submerged depending upon the specific gravity of said liquid, a body of mercury being located to move with said float, a tube extending into said body of mercury an amount dependent upon the amount said float is submerged, means to force air through said tube, the back pressure of the air varying in accordance with the amount said tube projects into said body of mercury and therefore in accordance with the ratio of the specific gravity of said liquid and of said mercury, and means to measure the value of the back pressure of said air.

5. In a system to measure the specific gravity of a liquid, a receptacle for a body of liquid to be measured and operative to maintain said body at a constant level, a float having in it a body of a second liquid heavier than the liquid to be measured, said float being partly submerged in said liquid to be measured, means cooperating with said second liquid to produce a pressure varying in accordance with a predetermined amplification of the amount said float is submerged and therefore in accordance with the specific gravity of the liquid to be measured, and exhibiting means responsive to said pressure.

JOHN FREDERICK MAIENSHEIN.

REFERENCES CITED

The following references are of record in the file of this patent:

UNITED STATES PATENTS

| Number | Name | Date |
|---|---|---|
| 1,770,559 | Taylor | July 15, 1930 |
| 2,248,322 | Annin | July 8, 1941 |
| 2,251,771 | Wynn et al. | Aug. 5, 1941 |
| 1,761,295 | Greenfield | June 3, 1930 |
| 1,822,458 | Rowland et al. | Sept. 8, 1931 |
| 2,272,970 | Frymoyer | Feb. 10, 1942 |
| 2,210,027 | Cran | Aug. 6, 1940 |
| 2,205,678 | Adams | June 25, 1940 |
| 1,664,840 | Ermine | Apr. 3, 1928 |
| 1,697,455 | Burningham et al. | Jan. 1, 1929 |

FOREIGN PATENTS

| Number | Country | Date |
|---|---|---|
| 668,390 | French | July 9, 1929 |